United States Patent
Shen et al.

(10) Patent No.: US 9,462,559 B2
(45) Date of Patent: Oct. 4, 2016

(54) METHODS FOR RADIO TECHNOLOGY SELECTION AND POWER CALIBRATION IN MULTI-RAT SMALL CELLS

(71) Applicant: QUALCOMM Incorporated, San Diego, CA (US)

(72) Inventors: Cong Shen, San Diego, CA (US); Farhad Meshkati, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/485,623

(22) Filed: Sep. 12, 2014

(65) Prior Publication Data

US 2015/0117360 A1 Apr. 30, 2015

Related U.S. Application Data

(63) Continuation-in-part of application No. 14/485,511, filed on Sep. 12, 2014.

(60) Provisional application No. 61/897,132, filed on Oct. 29, 2013.

(51) Int. Cl.
| | |
|---|---|
| H04W 52/24 | (2009.01) |
| H04W 24/10 | (2009.01) |
| H04W 52/38 | (2009.01) |
| H04W 24/02 | (2009.01) |
| H04W 88/10 | (2009.01) |

(52) U.S. Cl.
CPC ........... *H04W 52/242* (2013.01); *H04W 24/10* (2013.01); *H04W 52/38* (2013.01); *H04W 24/02* (2013.01); *H04W 88/10* (2013.01)

(58) Field of Classification Search
CPC .......... H04L 12/2647; H04L 12/2652; H04L 29/03955; H04L 43/0829; H04W 28/0236; H04W 52/242; H04W 24/10
See application file for complete search history.

(56) References Cited

U.S. PATENT DOCUMENTS

| | | | |
|---|---|---|---|
| 2008/0244148 A1 | 10/2008 | Nix, Jr. et al. | |
| 2010/0329210 A1* | 12/2010 | Shirota et al. | ................ 370/331 |
| 2012/0052793 A1 | 3/2012 | Brisebois et al. | |
| 2012/0147764 A1 | 6/2012 | Wang et al. | |
| 2012/0250548 A1* | 10/2012 | Swaminathan et al. | ...... 370/252 |
| 2013/0040688 A1 | 2/2013 | Mizusawa | |

(Continued)

FOREIGN PATENT DOCUMENTS

| | | |
|---|---|---|
| WO | 2012134567 A1 | 10/2012 |
| WO | 2013100827 A1 | 7/2013 |
| WO | 2014137569 A1 | 9/2014 |

OTHER PUBLICATIONS

International Search Report and Written Opinion—PCT/US2014/055707—ISA/EPO—Nov. 24, 2014.

*Primary Examiner* — Benjamin H Elliott, IV
(74) *Attorney, Agent, or Firm* — Arent Fox LLP

(57) ABSTRACT

Described herein are techniques for radio technology selection and power calibration in multi-RAT small cells. For example, the technique may involve determining, at an access point, path loss information for a circuit switched fallback failure location. The technique may involve building a path loss database over a time period from the path loss information and managing power or operation mode of a first RAT and a second RAT of the access point based on the path loss database.

18 Claims, 10 Drawing Sheets

(56) References Cited

U.S. PATENT DOCUMENTS

| | | | |
|---|---|---|---|
| 2013/0189999 A1* | 7/2013 | Nakata | 455/446 |
| 2013/0194989 A1 | 8/2013 | Centonza et al. | |
| 2013/0310077 A1* | 11/2013 | Siomina et al. | 455/456.2 |
| 2013/0322235 A1 | 12/2013 | Khoryaev et al. | |
| 2014/0086173 A1 | 3/2014 | Sadeghi et al. | |
| 2014/0094149 A1 | 4/2014 | Claussen et al. | |
| 2014/0098761 A1 | 4/2014 | Lee et al. | |
| 2014/0128078 A1 | 5/2014 | Zhu et al. | |
| 2014/0335883 A1 | 11/2014 | Ericson et al. | |
| 2015/0117360 A1* | 4/2015 | Shen et al. | 370/329 |
| 2015/0119063 A1 | 4/2015 | Yu et al. | |

* cited by examiner

METHODS FOR RADIO TECHNOLOGY SELECTION AND POWER CALIBRATION IN MULTI-RAT SMALL CELLS

CROSS-REFERENCE TO RELATED APPLICATION

The present Application for Patent is a continuation in part of application Ser. No. 14/485,511, filed Sep. 12, 2014, entitled "MODE SELECTION AND TRANSMIT POWER MANAGEMENT FOR MULTIMODE SMALL CELLS", which claims priority to Provisional Application No. 61/897,132, filed Oct. 29, 2013, entitled "MODE SELECTION AND TRANSMIT POWER MANAGEMENT FOR MULTIMODE SMALL CELLS" and which is assigned to the assignee hereof, and is hereby expressly incorporated in its entirety by reference herein.

BACKGROUND

Aspects of the present disclosure relate generally to wireless communication systems, and more particularly to mode selection and power management for a multimode small cell.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc.

A small cell may have more than one radio access technology (RAT) such as 3G, LTE, WLAN, etc. However, optimizing operation of the different RATs may be challenging. In this context, there remains a need for mechanisms for operation of the RATs at a small cell.

SUMMARY

Techniques for radio technology selection and power calibration in multi-RAT small cells as described herein. In the techniques described herein, a small cell access point may be configured with a first RAT (e.g., cdma2000) and a second RAT (e.g., LTE). A UE using the second RAT that wishes to switch to using the first RAT may trigger a circuit switched fallback. However, if the UE is in an area with second RAT coverage but without first RAT coverage, the UE will experience a circuit switched fallback failure. To provide the best user experience, the coverage of both the first RAT and second RAT may be carefully matched, via the selection of the operational mode and calibrating the transmission power of each technology.

For example, the small cell may determine whether to enable the first RAT to provide coverage to those areas where the macro cell's first RAT coverage is insufficient. The small cell may also determine whether to reduce the small cell's second RAT transmit power to remove second RAT coverage to those areas where the macro cell's first RAT coverage is insufficient.

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In accordance with one or more aspects of the implementations described herein, there is provided a system and method for radio technology selection and power calibration in multi-RAT small cells. The method includes determining, at an access point, path loss information for a circuit switched fallback failure location. The method includes building a path loss database over a time period from the path loss information and managing power or operation mode of a first RAT and a second RAT of the access point based on the path loss database.

In another aspect, the method further includes determining a path loss value based on the path loss database and comparing the path loss value with a threshold value, wherein the managing is based on the comparing.

In another aspect, the method further includes enabling the first RAT of the access point, in response to determining that the path loss value is less than the threshold value.

In another aspect, the method further includes reducing a transmit power level by a reduction amount for the second RAT of the access point, in response to determining that the path loss value is greater than the threshold value.

In another aspect, the method further includes collecting at least one circuit switched fallback failure report for a duration, wherein determining the path loss information is based on the at least one circuit switched fallback failure report.

In another aspect, the method further includes receiving, from a user equipment, a measurement report for the second RAT, in response to the user equipment experiencing a circuit switched fallback failure, wherein determining the path loss information is based on the measurement report for the second RAT.

In another aspect, the method further includes receiving, from a user equipment, a second RAT signal measurement, in response to a first RAT signal measurement being below a first threshold and the second RAT signal measurement being above a second threshold, wherein determining the path loss information is based on the second RAT signal measurement.

In another aspect, the method further includes periodically receiving, from a user equipment, a first RAT signal measurement and a second RAT signal measurement, wherein the first RAT signal measurement and the second RAT signal measurement are received as a pair substantially simultaneously or within a time period from each other. The method includes determining a specific pair where the first RAT signal measurement is below a first threshold and the second RAT signal measurement is above a second threshold, wherein determining the path loss information is based on the second RAT signal measurement from the specific pair.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 5b illustrates further aspects of the methodology for radio technology selection and power calibration for a multi-RAT small cell of FIG. 5a.

FIG. 5c illustrates further aspects of the methodology for radio technology selection and power calibration for a multi-RAT small cell of FIG. 5a.

FIG. 6a is an example apparatus in accordance with the methodology of FIG. 5a.

DETAILED DESCRIPTION

The present disclosure relates to techniques for mode selection and power management of a small cell. For example, the small cell may be configured for at least two radio access technologies (RATs), and the small cell may select a mode for each RAT based on measurements. The small cell may configure a transmit power of each RAT. The RATs may be any one of 3G, LTE, WLAN, etc.

In one example, there is provided a network entity (e.g., the small cell base station) configured with at least two RATs. The small cell may take measurements of a macro cell at a network listen module (NLM). Based on the NLM measurements, the small cell may configured a mode and transmit power of the RATs.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
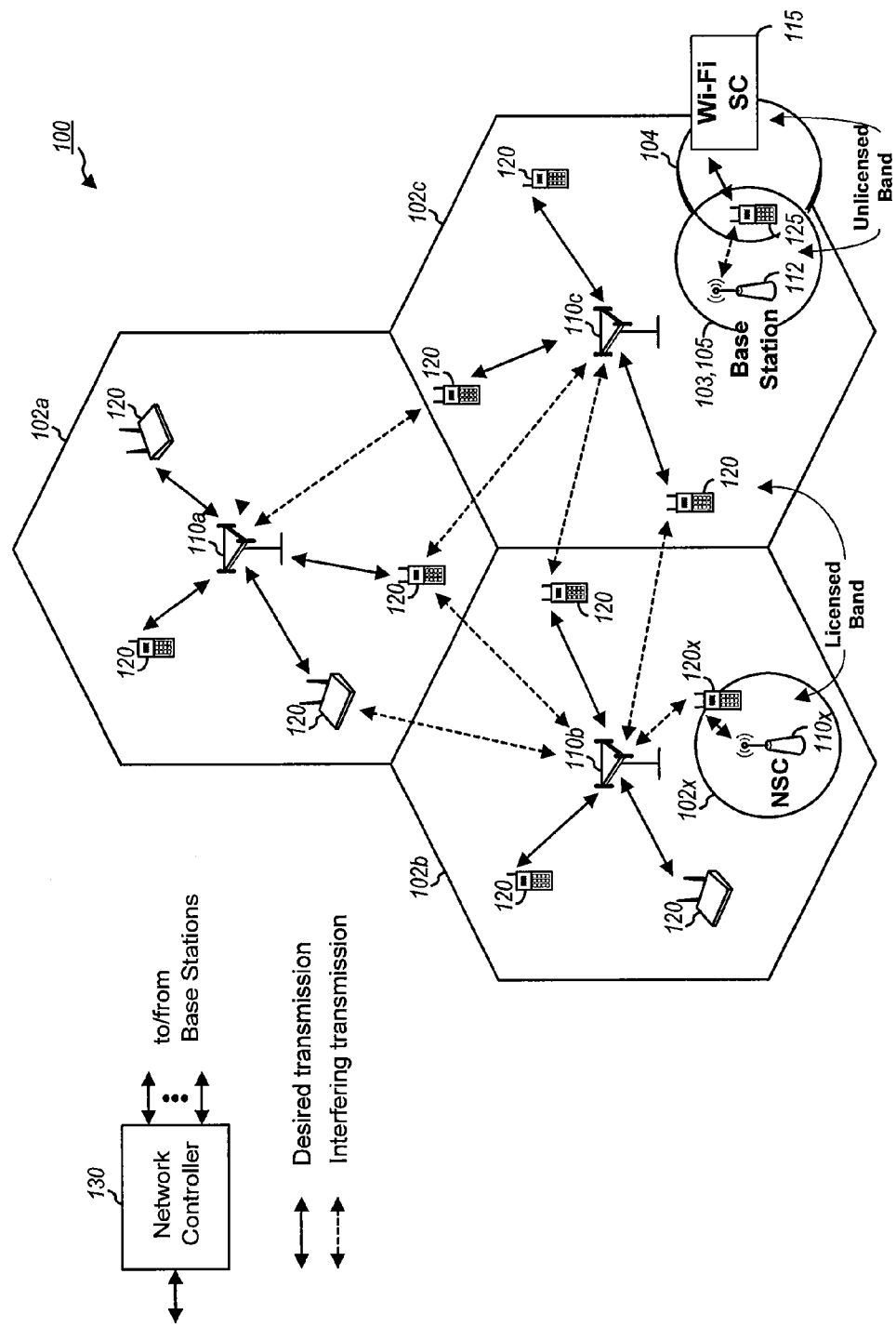
FIG. 1 is a block diagram conceptually illustrating an example of a telecommunications system.

FIG. 1 shows an example wireless communication network 100, which may be an LTE network or the like. The wireless network 100 may include a number of base stations 110 (e.g., evolved Node Bs (eNBs), neighborhood small cells (NSCs), etc.) and other network entities. A base station may be a station that communicates with the UEs and may also be referred to as a Node B, an AP, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell or a small cell (e.g., a pico cell, a femto cell, etc.), and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A small cell may cover a relatively small geographic area (e.g., a home) and may allow restricted access by UEs having association with the small cell (e.g., UEs in a closed subscriber group (CSG), UEs for users in the home, etc.). It is noted that a small cells are examples of NSCs.

An eNB for a macro cell may be referred to as a macro eNB. An eNB for a pico cell may be referred to as a pico eNB. An eNB for a NSC may be referred to as a NSC eNB or a home eNB (HNB). In the example shown in FIG. 1, the eNBs 110a, 110b and 110c may be macro eNBs for the macro cells 102a, 102b and 102c, respectively. An eNB may be configured with at least two RATs. For example, the eNB may include modules for LTE, 1x, and WLAN. In the case of a WLAN-enabled eNB, the eNB may operate in the unlicensed spectrum. The eNB 110x may be a NSC eNB for a NSC 102x, serving a UE 120x. In the present example, eNB 110x operates in licensed bands, as do the eNBs 110a, 110b and 110c. In contrast, a base station 112 operates in an unlicensed band, and includes both a NSC eNB module for a NSC 103 and a WLAN AP module to provide Wi-Fi coverage in a service area 105. The multiple-RAT base station 112 may serve a UE 125 that is configured to operate in the unlicensed band, either via the NSC 103 or via Wi-Fi, assuming the UE 125 is within the coverage area 105 and configured for Wi-Fi (i.e., includes a Wi-Fi radio module).

Figure 2:
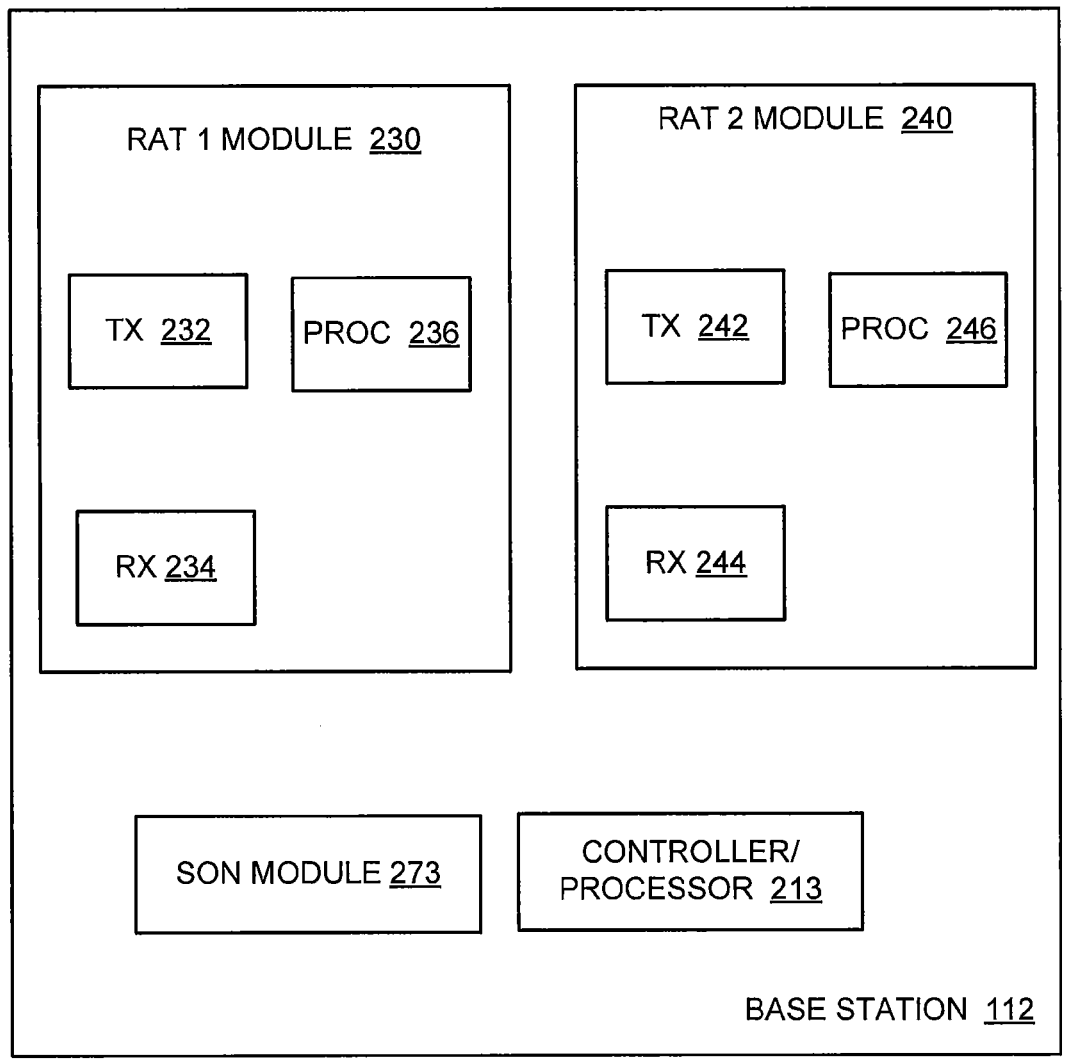
FIG. 2 shows a base station with multiple radio access technologies (RATs).

An example multiple-RAT base station 112 is shown in FIG. 2. For example, a first RAT module 230 (e.g., LTE module) and a second RAT module 240 (e.g., 1× module) may be co-located.

The base station 112 may optionally include a controller/processor module 213 and/or self-organizing network (SON) module 273 in operative communication with the NSC RAT 1 module 230 and the RAT 2 module 240 to coordinate the activity of the modules 230, 240 and/or components thereof. The SON module 273 may perform operations related to SON features of the base station 112. For example, the SON module 273 may enable distributed optimization of the base stations.

In related aspects, the RAT 1 module 230 may include a transmitter (TX) component 232, a receiver (RX) component 234, a processor component 236, wherein each of the components are in operative communication with each other.

The RAT 1 module 230 may include one or more of the components of base station 112 shown on the left hand side of FIG. 2. The RAT 2 module 240 may include a TX component 242, a RX component 244, and a processor component 246, wherein each of the components are in operative communication with each other. In further related aspects, one or more of the components 232-236 may be configured to manage the power of the RAT 1 module. Additionally or alternatively, the controller/processor 213 or controller/processor 213 coupled to components 232-236 may be configured to manage the power of the RAT 1 module.

In further related aspects, one or more of the components 242-246 may be configured to manage the power of the RAT 2 module. Additionally or alternatively, the controller/processor 213 or controller/processor 213 coupled to components 242-246 may be configured to manage the power of the RAT 2 module.

With reference once again to FIG. 1, a network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 3:
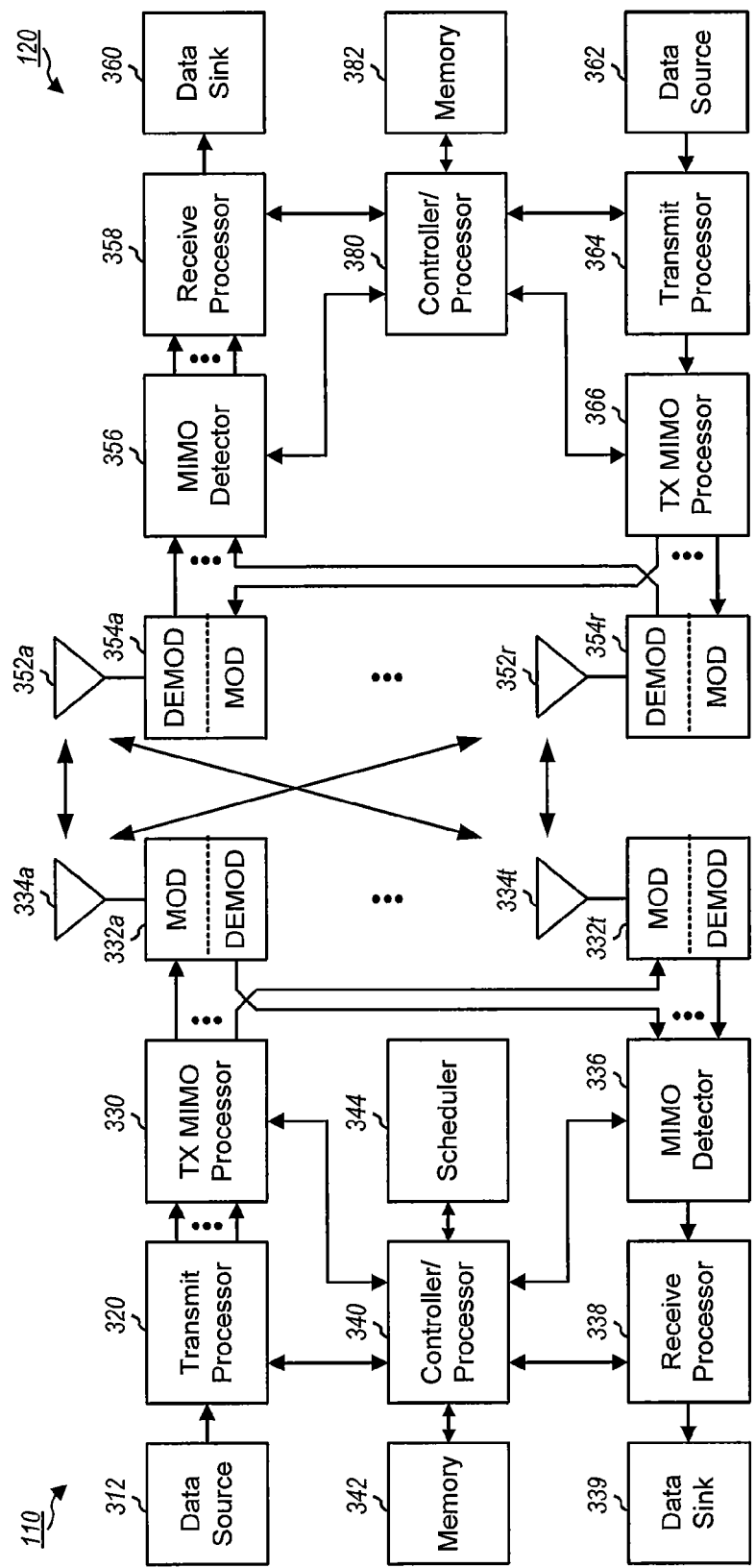
FIG. 3 is a block diagram illustrating a design of a base station/eNB and a UE configured according to one aspect of the present disclosure.

FIG. 3 shows a block diagram of a design of a base station 110 and a UE 120, which may be one of the base stations (e.g., an NSC such as 110x, 110y, or 110z) and one of the UEs, respectively, in FIG. 1. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of the functional blocks illustrated in FIG. 5, and/or other processes for the techniques described herein. The memories 342 and 382 may store data and program codes for the base station 110 and the UE 120, respectively. A scheduler 344 may schedule UEs for data transmission on the downlink and/or uplink.

As will be readily appreciated, antennas 334, modulators 332, transmit processor 320, and/or TX MIMO processor 330 may form a transmit chain of eNB 120 and supply means for sending or transmitting downlink signals under the control of processor 340.

As will be readily appreciated, antennas 334, demodulators 354, receive processor 338, and/or RX MIMO detector 336 may form a receive chain of eNB 120 and supply means for taking measurements (e.g., of a nearby macro cell). The eNB 120 may include a network listen module (not shown) for taking the measurements.

In one aspect, processor 340 may include modules for performing operations of the methods described herein, by executing instructions held in the memory 342. The processor 340 may include means for taking measurements of the macro cells, and means for mode selection and power management of the RATs.

In accordance with one or more aspects of the disclosure, there are provided methods and apparatuses for operation of a small cell configured with multiple RATs.

This disclosure provides algorithms for mode selection and transmit power management at small cells that may have more than one RAT (e.g., 3G, LTE, WLAN, etc.) The mode selection algorithm may determine if a particular RAT at the small cell needs to be turned on or off based on the neighborhood information (e.g., measurements from neighbor cells). The downlink transmit power management algorithm may provide similar coverage footprints across different technologies. The algorithms may rely on inputs from the NLM, UE reports, OAM, information received over X2, etc. The algorithm may improve or maximize network available and utility. The implementation of the algorithm may be distributed or centralized. For example, in a distributed scenario, each small cell may collect the data and configure the mode and power of the RATs. In another example, in a centralized scenario, a centralized entity (e.g., one of the small cells, a network node, etc.), may collect the data (e.g., from the small cells) and direct the small cells to configured the mode and power of the RATs.

In a network where an operator may have multiple frequencies (e.g., f1, f2, and f3) for deploying macro cells and small cells (e.g., femto, pico, micro, etc.), it may be possible to deploy small cells with multiple RATs. For example, 3G may operate on f1 and f2, while LTE operates on f3. Furthermore, co-channel or dedicated channel deployment scenarios for 3G deployment may be possible. For example, small cells may be deployed in one frequency (e.g., f1) and macro cells may be deployed either f1, f2 or only in f2. The small cells may operate in any of the modes including open, closed, or hybrid mode.

The objectives for the techniques may include determining if a technology at the small cell needs to be turned on or off, and managing the transmit power of the small cell to match coverage offered by technologies. For example, it may be a feature to match LTE coverage to 3G coverage at the small cell to enable circuit switched fallback from LTE to 3G. In another example, transmit powers across RATs may be matched to maintain similar user experiences across different technologies.

The algorithm may use information from the NLM, UE reports, information received over X2, from OAM, etc. to determine an appropriate mode of operation and downlink transmit power levels. For example, a small cell may determine a correct mode of operation, e.g., for 3G and transmit power level for, e.g., LTE.

The algorithm may run at the small cell in a distributed implementation or at a central server in a centralized implementation. The methods may be applied to different technologies.

Figure 4:
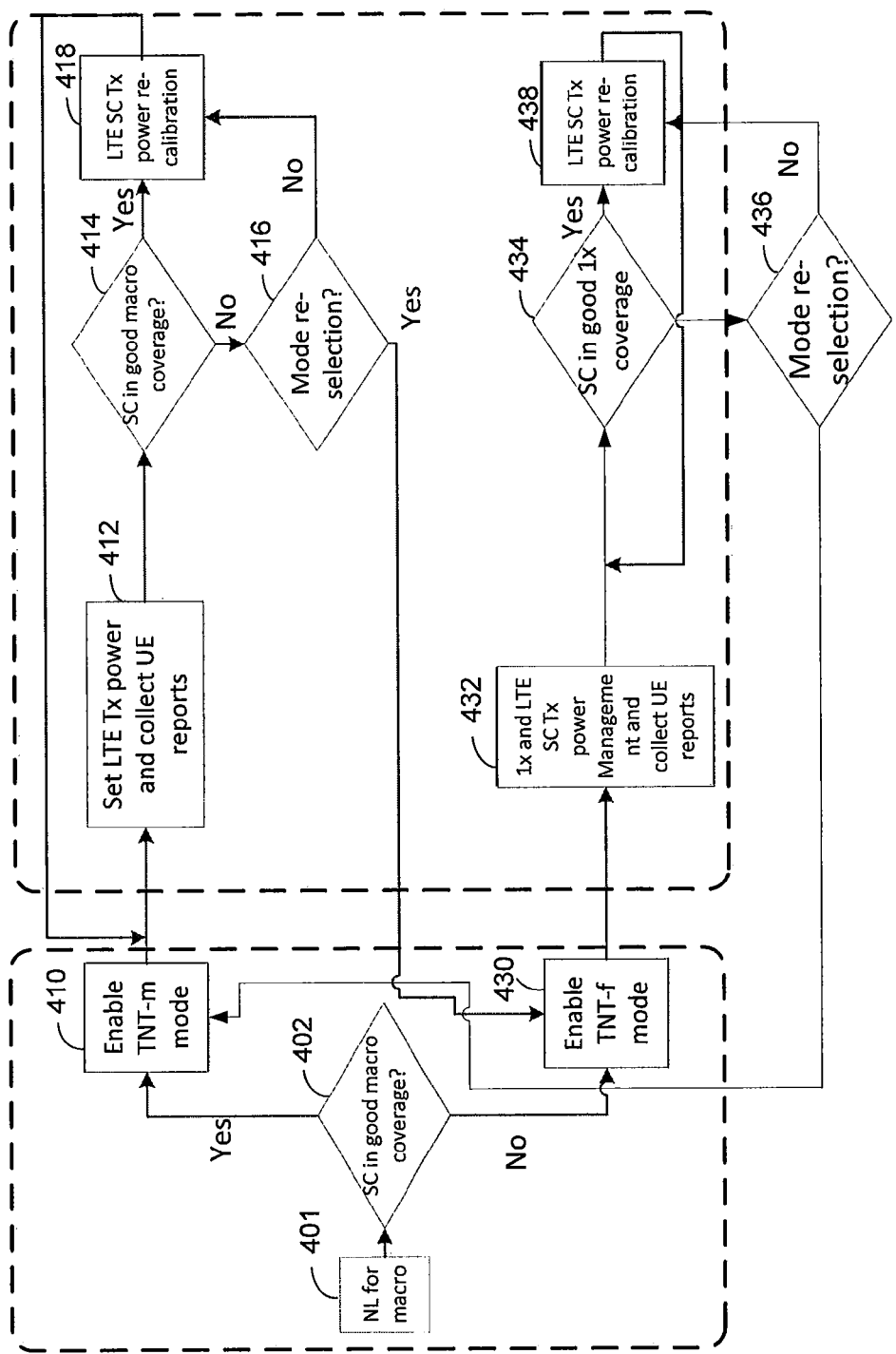
FIG. 4 is an example flow diagram for operation of a small cell configured for multiple RATs.

FIG. 4 is an example flow diagram for operation of a small cell configured for multiple RATs.

At power up, a node (e.g., a small cell) may take NL measurements (or rely on configuration by an OEM) and select a transmission mode of the RATs at the node. For example, the node may be configured with two or more RATs (e.g., LTE, 3G, WLAN, etc.). If a macrocell (e.g., a 3G macrocell) in vicinity is strong, the small cell may make use of the strong macrocell ("home to a macro cell"). Otherwise, the small cell may provide 3G coverage to complement the weak macro cell ("home to a femto cell").

If a small cell homes to the macro cell, it may shut down 3G transmission or lower its power and may set a large coverage area for other technologies (LTE, WLAN, etc.). UE reports may be collected through intra- and inter-RAT measurements. If UE reports indicate that areas in good LTE coverage are also well-covered by macro cells, the node may react by powering up the LTE transmit power. If the UE reports indicate macro cell coverage holes, the node may have two options. In one option the node may either re-select to home to the small cell, or the node may power down the LTE transmit power so as to constrain the LTE coverage to be within the macro cell coverage. The option that provides better LTE coverage may be selected.

If a node homes to the small cell, the initial transmit power may be determined by NL-based power calibration. The key criterion may be to match the LTE coverage with the 1× small cell coverage. Coverage matching is based on criterion such as, for example, signal-to-noise ratio (SNR), reference signal received power (RSRP), energy to interference (Ec/Io), throughput, etc. Based on the collected UE reports, the small cell may fine-tune the LTE transmit power. If there are 1× coverage holes, the LTE transmit power may be lowered. Otherwise, the LTE transmit power may be increased.

The algorithm may run at each small cell in a distributed manner. In such case, the small cells perform the methods without instructions from a central node or other neighbor nodes.

In another other implementation, the algorithm may reside at a central server that collects NLM measurements, UE reports from small cells, and may takes action to optimize a utility function. The centralized algorithm may determine the mode and transmit power and communicate them to each small cell.

Furthermore, coverage matching may also be achieved by throttling user rate on the RATs. For instance reducing the amount of resources (time, frequency) to users on LTE may be done when the UEs move beyond 3G coverage.

The method illustrated in FIG. 4 may apply to measurements from the NLM and/or UE reports. The disclosure, however, is not limited to such measurements and reports. Another module or another device (e.g., a neighbor node) may provide data for mode selection and power control.

At step 401, the method may collect data from a NL module. For example, the data may be collected from a nearby macro cell. At step 2, the method may determine whether a small cell is in good macro cell coverage based on a threshold (e.g., a predetermined threshold, user defined threshold, network operator input, etc.).

In a first branch corresponding to a determination of good macro cell coverage based on the threshold, at step 402, the method may enable a first mode (e.g., TNT-m mode). The method may proceed to step 410 and set a first RAT (e.g., LTE) transmission power. For example the method may set LTE power to a maximum power. The method may disable 1× or set 1× to a minimum power when the small cell is in a good macro cell coverage area. When there is good macro cell coverage, 1× coverage may not need to be provided by the small cell. At step 412, the method may receive measurement reports from one or more UEs. At step 414, the method may determine whether the small cell is in a good macro cell coverage based on the received measurements from the UEs. The coverage of the macro cell may be different than indicated from the NL module because the coverage as experienced at the UEs may be different than that of the small cell. If the method determines that the coverage is not good, the method may proceed to step 416. At step 416, the method may determine whether to re-select to another mode. In some cases, the mode re-selection may be based on any combination of the measurement reports and/or NL measurements. In some cases, the decision may be based on other metrics or predetermined conditions. If it is determined to re-select the mode, then the method may proceed to step 430. Otherwise, if mode reselection is not necessary, the method proceeds to step 418, where the LTE transmission power may be calibrated. For example, the LTE power may be calibrated based on any combination of the NL measurements and/or reports from the UEs. Following step 418, the method returns to step 412.

Return to step 402, if the method determines that the small cell is not in a good coverage area, then the method may proceed to step 430 to select a mode (e.g., TNT-f mode). In one example, if coverage is not good, the small cell may complement the macro cell coverage by providing 1× coverage. In this case, the small cell may set the 1× coverage to a maximum. At step 432, the method may set the 1× and LTE transmit power to a maximum. The method may collect UE reports at 432. The method proceeds to step 434 to determine whether the small cell is in a good macro cell coverage based on the received measurements from the UEs. The coverage of the macro cell may be different than indicated from the NL module because the coverage as experienced at the UEs may be different than that of the small cell. If the method determines that the coverage is not good, the method may proceed to step 436. At step 436, the method may determine whether to re-select to another mode. In some cases, the mode re-selection may be based on any combination of the measurement reports and/or NL measurements. In some cases, the decision may be based on other metrics or predetermined conditions. If it is determined to re-select the mode, then the method may proceed to step 410. Otherwise, if mode reselection is not necessary, the method proceeds to step 438, where the LTE transmission power may be calibrated. For example, the LTE power may be calibrated based on any combination of the NL measurements and/or reports from the UEs. Following step 438, the method returns to step 434.

An example scenario involves a small cell access point, which may be configured with a first RAT (e.g., cdma2000) and a second RAT (e.g., LTE). The first RAT may be initially disabled at the small cell, because there is good first RAT coverage from a macro cell at the small cell's location. However, this initial configuration may not be ideal for all areas. For example, there may exist areas in which the small cell's second RAT transmit power provides sufficient second RAT coverage, but where the macro cell's first RAT coverage is insufficient for the area.

A UE using the second RAT that wishes to switch to using the first RAT may trigger a circuit switched fallback. However, if the UE is in an area with second RAT coverage but without first RAT coverage, the UE will experience a circuit switched fallback failure. Thus, a circuit switched fallback failure may indicate a mismatch between the coverage areas of the first RAT and the second RAT and may negatively impact user experience. As an example to illustrate this negative user experience, a user of a mobile phone currently serviced by LTE may wish to make a call on a circuit switched network. The user may then attempt to switch to a cdma2000 service. However, if the user is in an area with LTE coverage but without cdma2000 coverage, the resulting circuit switched fallback failure may prevent the user from making the call. Therefore, to provide the best user experience, the coverage of both the first RAT and second RAT may be carefully matched via the selection of the operational mode of each RAT and calibration of the transmission power for each RAT. A design objective may be to have a unified user experience, i.e., if a location has LTE coverage from the small cell, it should also have cdma2000 coverage, either from the small cell cdma2000 or from the macrocell cdma2000. A decision of whether cdma2000 service comes from a small cell or a macrocell may be determined based on the intended coverage area and conditions in the area.

In an example scenario, the small cell may determine whether to enable the first RAT to provide coverage to those areas where the macrocell's first RAT coverage is insufficient. In those areas where the macro cell's first RAT coverage may be insufficient, the small cell may determine whether to reduce the small cell's second RAT transmit power to match the small cell's second RAT coverage to the macrocell's first RAT coverage. In an exemplary aspect corresponding to this example scenario, the small cell may have a second RAT enabled with a transmit power $P_{RAT2}$. The small cell may initially have the first RAT disabled.

In one aspect, the small cell may receive at least one circuit switched fallback failure report from a UE. The at least one circuit switched fallback failure report may include path loss information between a location where the circuit switched fallback failure occurred and a location of the small cell.

In an alternative aspect, such as in case when circuit switched fallback failure reports do not include path loss information, the small cell may configure a UE to perform and report a second RAT measurement whenever the UE reports a circuit switched fallback failure. Path loss information may then be extracted from the second RAT measurement report.

In another alternative aspect, a UE may be configured to perform a second RAT signal measurement and report the second RAT signal measurement to the small cell, in response to a first RAT signal measurement being below a first threshold and the second RAT signal measurement being above a second threshold. Path loss information may be determined based on the second RAT signal measurement.

In yet another alternative aspect, the small cell may periodically receive, from a UE, a first RAT signal measurement and a second RAT signal measurement, where the first RAT signal measurement and the second RAT signal measurement are contemporaneously received as a pair. That is, substantially simultaneously in time or within a time period from each other. The small cell may determine a specific pair where the first RAT signal measurement is below a first threshold and the second RAT signal measurement is above a second threshold. Path loss information may then be determined based on the second RAT signal measurement from the specific pair.

In a related aspect, the small cell may build a path loss database from the path loss information. The small cell may then calculate a path loss value $PL_x$ based on the path loss database. If the $PL_x$ is less than or equal to a threshold value, then the small cell may enable the first RAT. The small cell may then calibrate a transmit power of the first RAT to match the coverage of the second RAT. If the $PL_x$ is greater than the threshold value, then the small cell may reduce the $P_{RAT2}$ by a reduction amount. The reduction amount may be calculated to allow the second RAT coverage provided by the small cell to match the first RAT coverage provided by the first RAT.

Figure 5A:
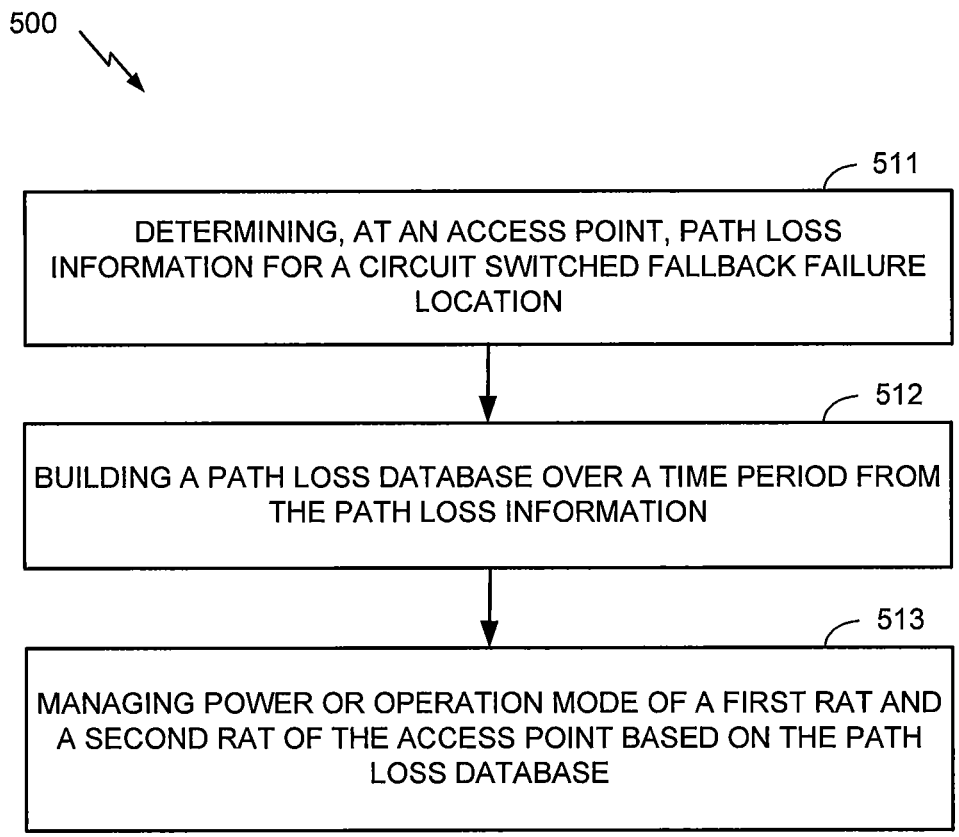
FIG. 5a illustrates aspects of a methodology for radio technology selection and power calibration for a multi-RAT small cell.

In accordance with one or more aspects of the implementations described herein, with reference to FIG. 5a, there is shown a methodology 500 for radio technology selection and power calibration for a multi-RAT small cell. The method 500, operable by a network entity or component(s) thereof, may involve, at 511 determining, at an access point, path loss information for a circuit switched fallback failure location. In an example implementation, the network entity may be the base station 112, as shown in FIG. 2.

The method 500 may involve, at 512, building a path loss database over a time period from the path loss information. In an example implementation, the processor 213 of the base station 112 may build the path loss database, as shown in FIG. 2.

The method 500 may involve, at 512, managing power or operation mode of a first RAT and a second RAT of the access point based on the path loss database. In an example implementation, the processor 213 of the base station 112 may manage the power or operation mode of the first RAT and the second RAT, as shown in FIG. 2.

Figure 5B:
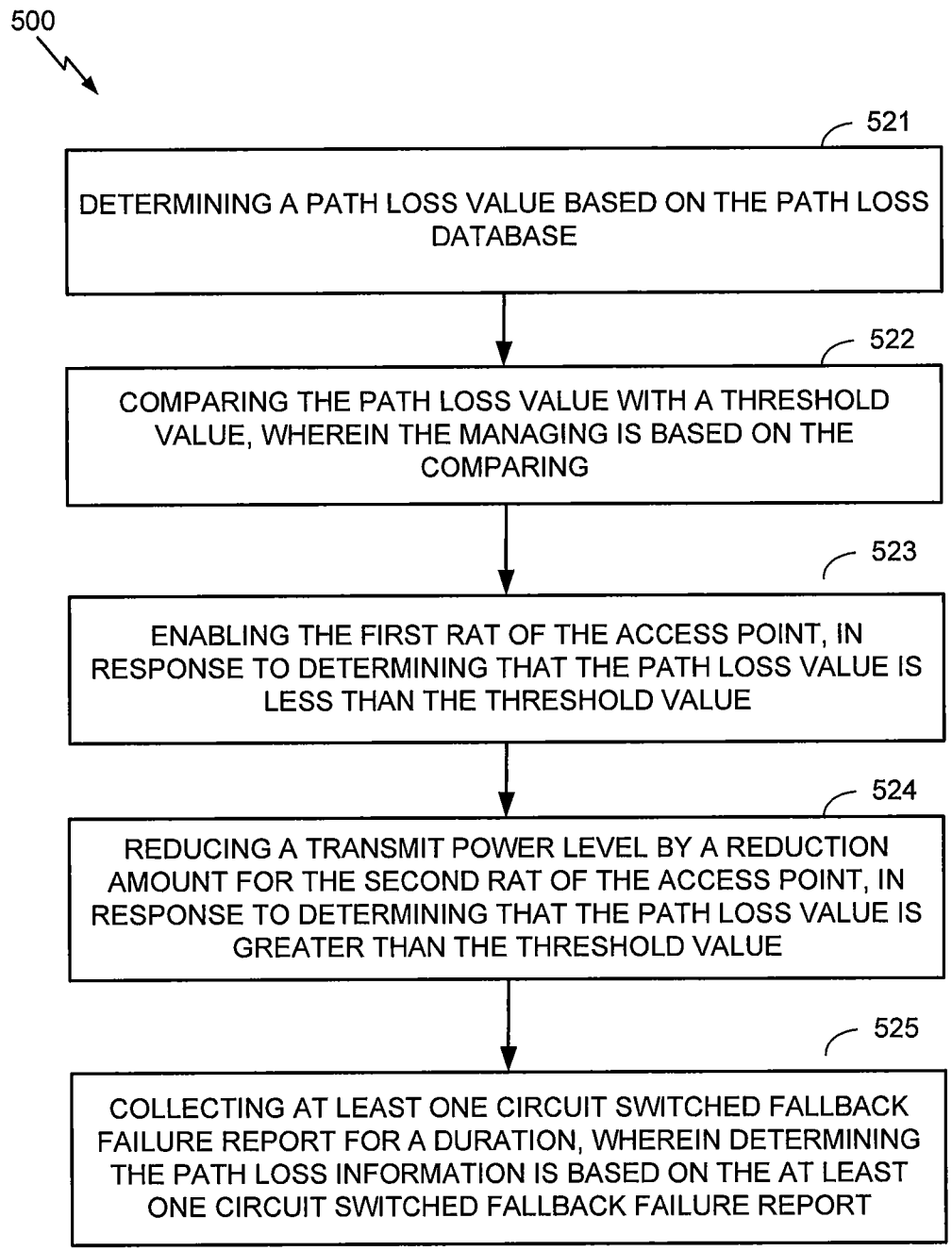

FIG. 5b illustrates further aspects of the methodology 500 for radio technology selection and power calibration for a multi-RAT small cell of FIG. 5a. The method 500 may terminate after any of the shown blocks without necessarily having to include any subsequent downstream block(s) that may be illustrated. It is further noted that numbers of the blocks do not imply a particular order in which the blocks may be performed according to the method 500.

The method 500 may optionally involve, at 521, determining a path loss value based on the path loss database. The method 500 may optionally involve, at 522, comparing the path loss value with a threshold value, wherein the managing is based on the comparing. The method 500 may optionally involve, at 523, enabling the first RAT of the access point, in response to determining that the path loss value is less than the threshold value. The method 500 may optionally involve, at 524, reducing a transmit power level by a reduction amount for the second RAT of the access point, in response to determining that the path loss value is greater than the threshold value. The method 500 may optionally involve, at 525, collecting at least one circuit switched fallback failure report for a duration, wherein determining the path loss information is based on the at least one circuit switched fallback failure report.

Figure 5C:
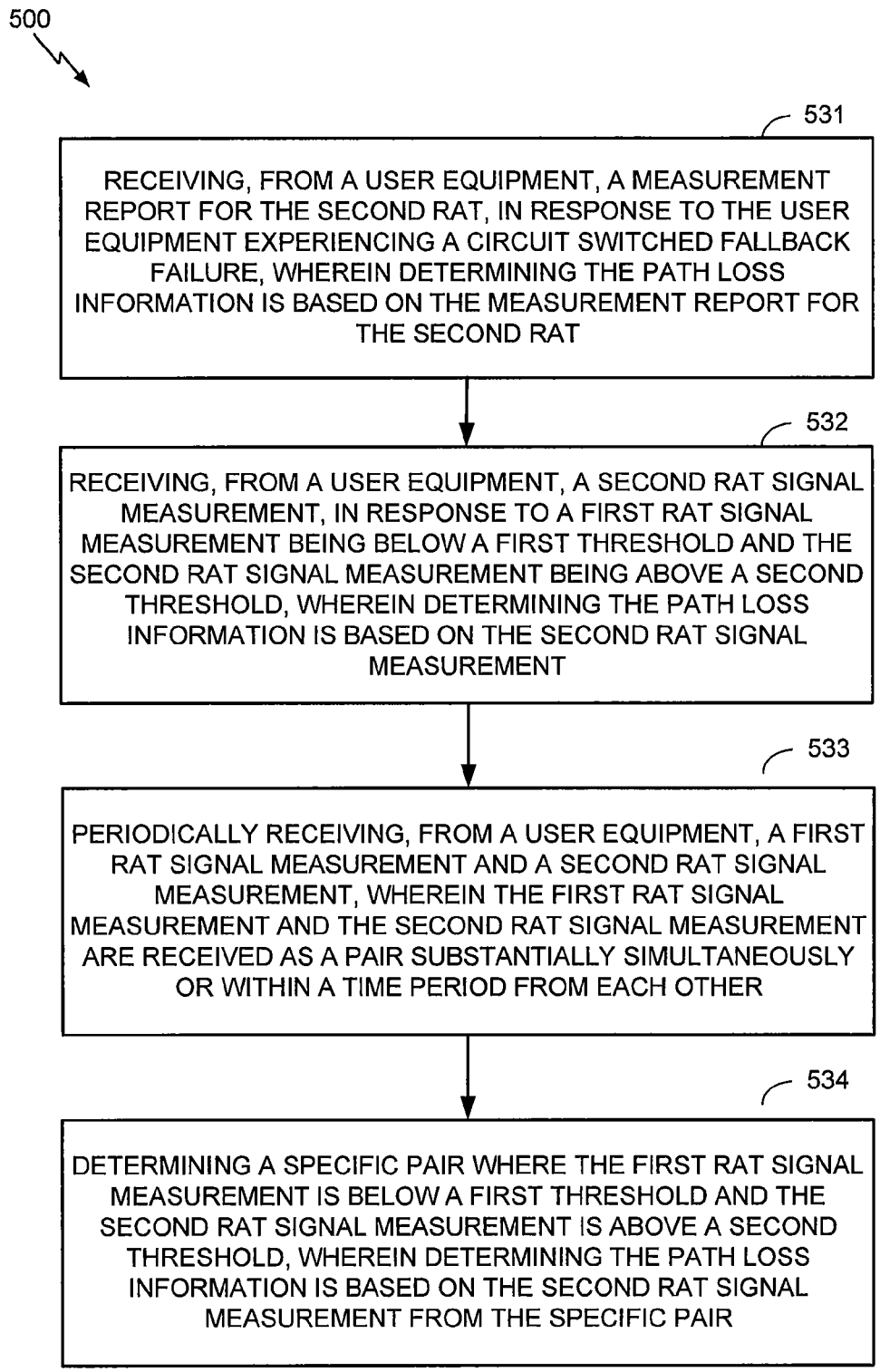

FIG. 5c illustrates further aspects of the methodology 500 for radio technology selection and power calibration for a multi-RAT small cell of FIG. 5a. The method 500 may terminate after any of the shown blocks without necessarily having to include any subsequent downstream block(s) that may be illustrated. It is further noted that numbers of the blocks do not imply a particular order in which the blocks may be performed according to the method 500.

The method 500 may optionally involve, at 531, receiving, from a user equipment, a measurement report for the second RAT, in response to the user equipment experiencing a circuit switched fallback failure, wherein determining the path loss information is based on the measurement report for the second RAT. The method 500 may optionally involve, at 532, receiving, from a user equipment, a second RAT signal measurement, in response to a first RAT signal measurement being below a first threshold and the second RAT signal measurement being above a second threshold, wherein determining the path loss information is based on the second RAT signal measurement. The method 500 may optionally involve, at 533, periodically receiving, from a user equipment, a first RAT signal measurement and a second RAT signal measurement, wherein the first RAT signal measurement and the second RAT signal measurement are received as a pair substantially simultaneously or within a time period from each other. The method 500 may optionally involve, at 534, determining a specific pair where the first RAT signal measurement is below a first threshold and the second RAT signal measurement is above a second threshold, wherein determining the path loss information is based on the second RAT signal measurement from the specific pair.

Figure 6A:
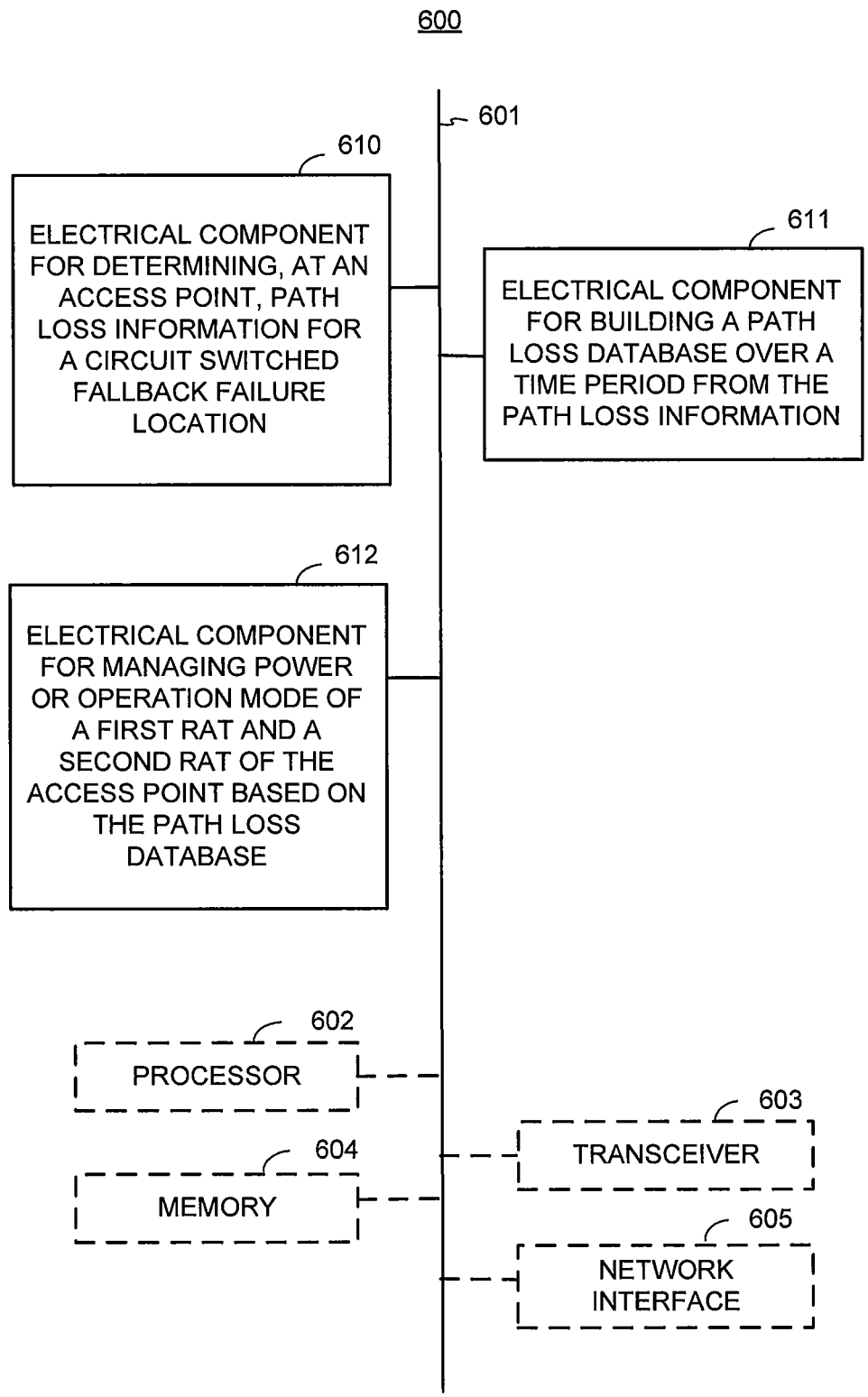

In accordance with one or more aspects of the implementations described herein, FIG. 6a is an example apparatus in accordance with the methodology of FIG. 5a. The exemplary apparatus 600 may be configured as a computing device or as a processor or similar device/component for use within. In one example, the apparatus 600 may include functional blocks that can represent functions implemented by a processor, software, or combination thereof (e.g., firmware). In another example, the apparatus 600 may be a system on a chip (SoC) or similar integrated circuit (IC).

In one implementation, apparatus 600 may include an electrical component or module 610 for determining, at an access point, path loss information for a circuit switched fallback failure location.

The apparatus 600 may include an electrical component 611 for building a path loss database over a time period from the path loss information.

The apparatus 600 may include an electrical component 612 for managing power or operation mode of a first RAT and a second RAT of the access point based on the path loss database.

In related aspects, the apparatus 600 may optionally include a processor component 602 having at least one processor, in the case of the apparatus 600 configured as a network entity, rather than as a processor. The processor 602, in such case, may be in operative communication with the components 610-612 via a bus 601 or similar communication coupling. The processor 602 may effect initiation and scheduling of the processes or functions performed by electrical components 610-612.

In further related aspects, the apparatus 600 may include a radio transceiver component 603. A standalone receiver and/or standalone transmitter may be used in lieu of or in conjunction with the transceiver 603. When the apparatus 600 is a network entity, the apparatus 600 may also include a network interface (not shown) for connecting to one or more core network entities. The apparatus 600 may optionally include a component for storing information, such as, for example, a memory device/component 604. The computer readable medium or the memory component 604 may be operatively coupled to the other components of the apparatus 600 via the bus 601 or the like. The memory component 604 may be adapted to store computer readable instructions and data for effecting the processes and behavior of the components 610-612, and subcomponents thereof, or the processor 602, or the methods disclosed herein. The memory component 604 may retain instructions for executing functions associated with the components 610-612. While shown as being external to the memory 604, it is to be understood that the components 610-612 can exist within the memory 604. It is further noted that the components in FIG. 6a may comprise processors, electronic devices, hardware devices, electronic sub-components, logical circuits, memories, software codes, firmware codes, etc., or any combination thereof.

Figure 6B:
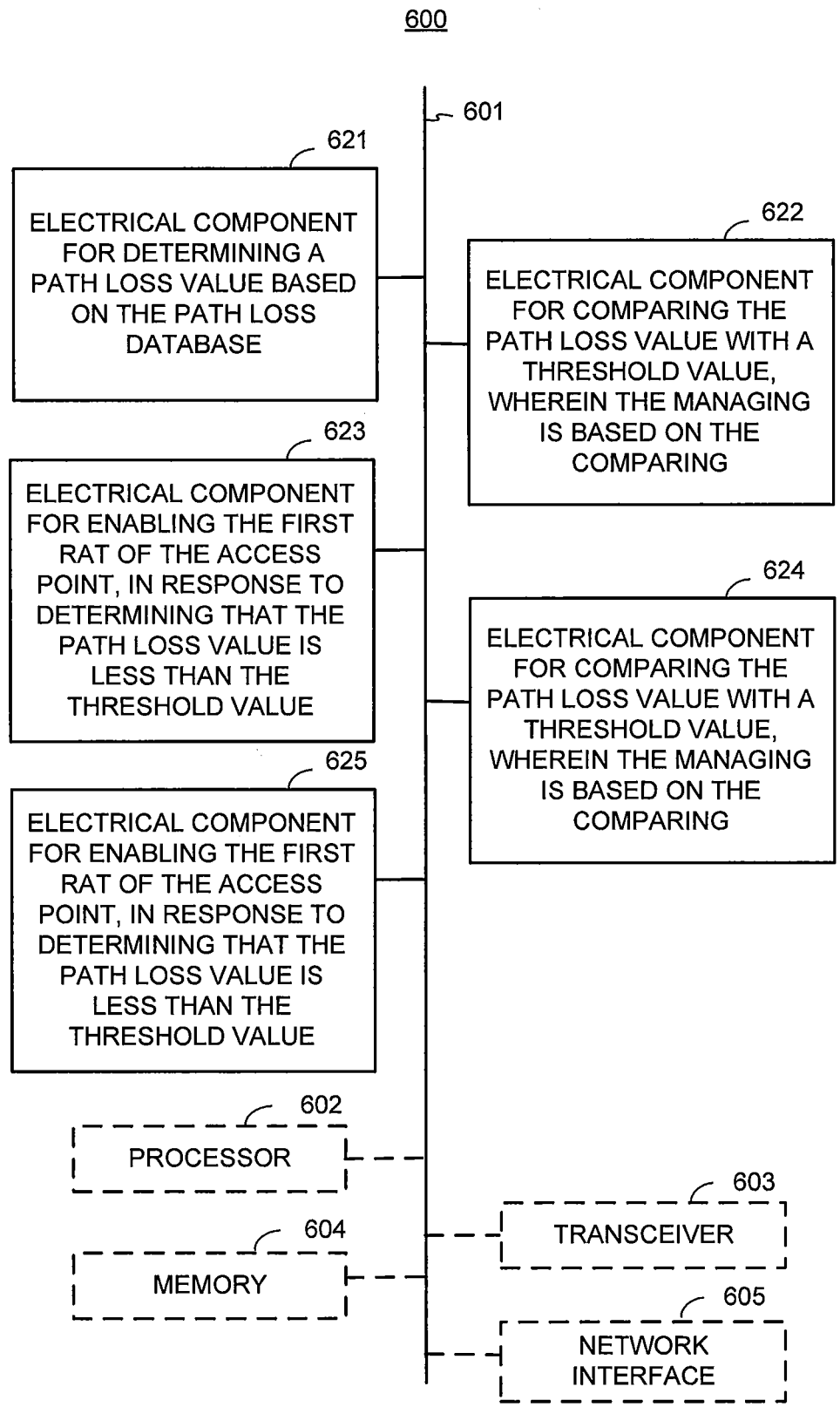
FIG. 6b is an example apparatus in accordance with the methodology of FIG. 5b.

In accordance with one or more aspects of the implementations described herein, FIG. 6b is an example apparatus in accordance with the methodology of FIG. 5b. The exemplary apparatus 600 may be configured as a computing device or as a processor or similar device/component for use within. In one example, the apparatus 600 may include functional blocks that can represent functions implemented by a processor, software, or combination thereof (e.g., firmware). In another example, the apparatus 600 may be a system on a chip (SoC) or similar integrated circuit (IC).

In one implementation, apparatus 600 may optionally include an electrical component or module 621 for determining a path loss value based on the path loss database.

The apparatus 600 may optionally include an electrical component 622 for comparing the path loss value with a threshold value, wherein the managing is based on the comparing.

The apparatus 600 may optionally include an electrical component 623 for enabling the first RAT of the access point, in response to determining that the path loss value is less than the threshold value.

The apparatus 600 may optionally include an electrical component 624 for comparing the path loss value with a threshold value, wherein the managing is based on the comparing.

The apparatus 600 may optionally include an electrical component 625 for enabling the first RAT of the access point, in response to determining that the path loss value is less than the threshold value.

For the sake of conciseness, the rest of the details regarding apparatus 600 of FIG. 6b are not further elaborated on. However, it is to be understood that the remaining features and aspects of the apparatus 600 of FIG. 6b are substantially similar to those described above with respect to apparatus 600 of FIG. 6a. Persons skilled in the art will appreciate that the functionalities of each component of apparatus 600 can be implemented in any suitable component of the system or combined in any suitable manner.

Figure 6C:
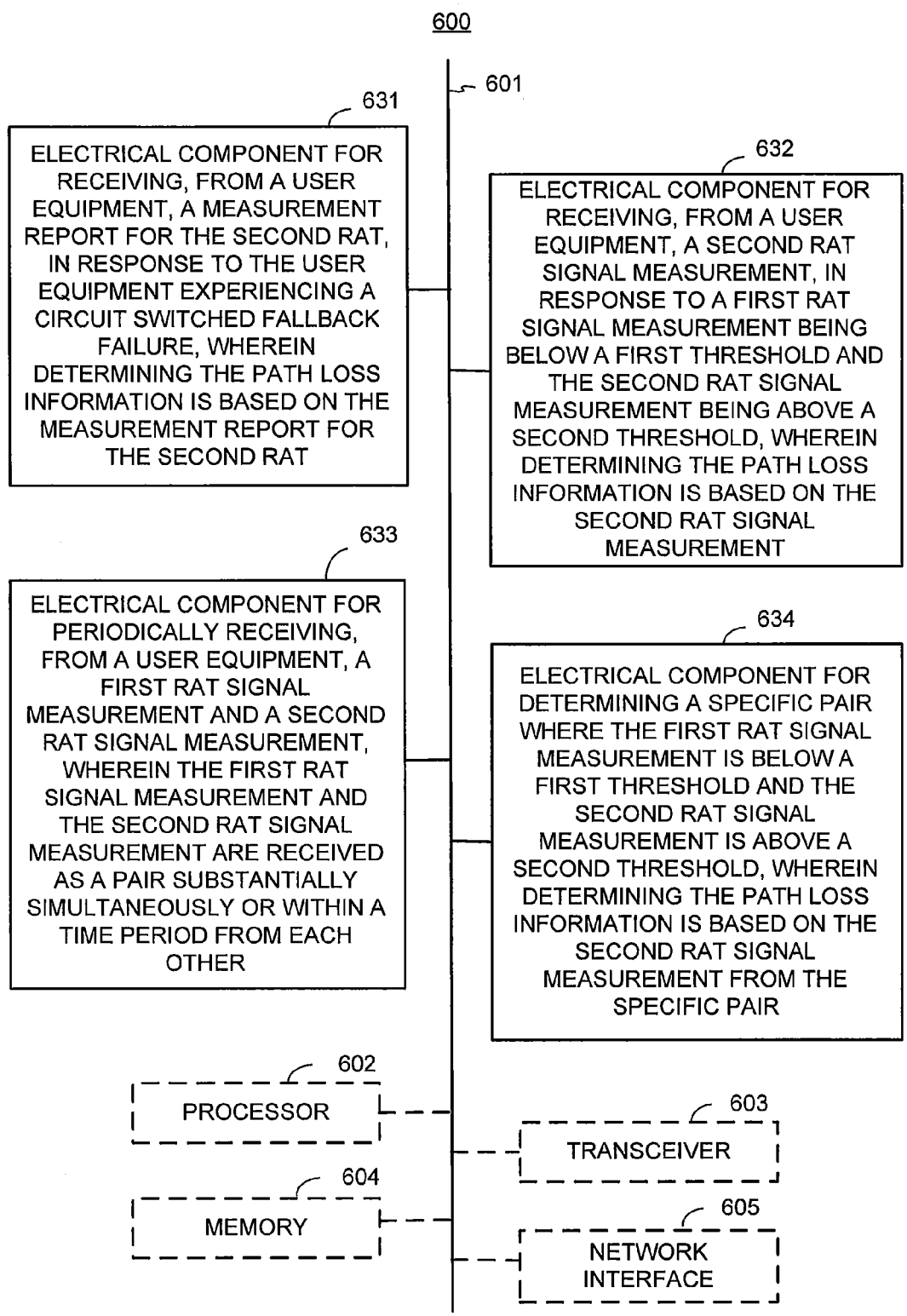
FIG. 6c is an example apparatus in accordance with the methodology of FIG. 5c.

In accordance with one or more aspects of the implementations described herein, FIG. 6c is an example apparatus in accordance with the methodology of FIG. 5c. The exemplary apparatus 600 may be configured as a computing device or as a processor or similar device/component for use within. In one example, the apparatus 600 may include functional blocks that can represent functions implemented by a processor, software, or combination thereof (e.g., firmware). In another example, the apparatus 600 may be a system on a chip (SoC) or similar integrated circuit (IC).

In one implementation, apparatus 600 may optionally include an electrical component or module 631 for receiving, from a user equipment, a measurement report for the second RAT, in response to the user equipment experiencing a circuit switched fallback failure, wherein determining the path loss information is based on the measurement report for the second RAT.

The apparatus 600 may optionally include an electrical component 632 for receiving, from a user equipment, a second RAT signal measurement, in response to a first RAT signal measurement being below a first threshold and the second RAT signal measurement being above a second threshold, wherein determining the path loss information is based on the second RAT signal measurement.

The apparatus 600 may optionally include an electrical component 633 for periodically receiving, from a user equipment, a first RAT signal measurement and a second RAT signal measurement, wherein the first RAT signal measurement and the second RAT signal measurement are received as a pair substantially simultaneously or within a time period from each other.

The apparatus 600 may optionally include an electrical component 634 for determining a specific pair where the first RAT signal measurement is below a first threshold and the second RAT signal measurement is above a second threshold, wherein determining the path loss information is based on the second RAT signal measurement from the specific pair.

For the sake of conciseness, the rest of the details regarding apparatus 600 of FIG. 6c are not further elaborated on. However, it is to be understood that the remaining features and aspects of the apparatus 600 of FIG. 6c are substantially similar to those described above with respect to apparatus 600 of FIG. 6a. Persons skilled in the art will appreciate that the functionalities of each component of apparatus 600 can be implemented in any suitable component of the system or combined in any suitable manner.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method for managing an access point configured for communication in a plurality of radio access technologies (RATs) in a wireless communication system, the method comprising:
   determining, at an access point, path loss information for a circuit switched fallback failure location;
   building a path loss database over a time period from the path loss information;
   managing power or operation mode of a first RAT and a second RAT of the access point based on the path loss database; and
   receiving, from a user equipment, a second RAT signal measurement, in response to a first RAT signal measurement being below a first threshold and the second RAT signal measurement being above a second threshold, wherein determining the path loss information is based on the second RAT signal measurement.

2. The method of claim 1, further comprising:
   determining a path loss value based on the path loss database; and
   comparing the path loss value with a threshold value, wherein the managing is based on the comparing.

3. The method of claim 2, further comprising enabling the first RAT of the access point, in response to determining that the path loss value is less than the threshold value.

4. The method of claim 2, further comprising reducing a transmit power level by a reduction amount for the second RAT of the access point, in response to determining that the path loss value is greater than the threshold value.

5. The method of claim 4, wherein the reduction amount is determined to cause coverage of the second RAT provided by the access point to match coverage of the first RAT provided by a macro cell.

6. The method of claim 1, further comprising collecting at least one circuit switched fallback failure report for a duration, wherein determining the path loss information is based on the at least one circuit switched fallback failure report.

7. The method of claim 1, further comprising receiving, from a user equipment, a measurement report for the second RAT, in response to the user equipment experiencing a circuit switched fallback failure, wherein determining the path loss information is based on the measurement report for the second RAT.

8. The method of claim 1, further comprising:
   periodically receiving, from a user equipment, a first RAT signal measurement and a second RAT signal measurement, wherein the first RAT signal measurement and the second RAT signal measurement are received as a pair substantially simultaneously or within a time period from each other; and
   determining a specific pair where the first RAT signal measurement is below a first threshold and the second RAT signal measurement is above a second threshold, wherein determining the path loss information is based on the second RAT signal measurement from the specific pair.

9. The method of claim 1, wherein the first RAT is 1× and the second RAT is Long-Term Evolution (LTE).

10. An apparatus configured for communication in a plurality of radio access technologies (RATs) in a wireless communication system, the apparatus comprising:
    at least one processor configured to:
      determine, at an access point, path loss information for a circuit switched fallback failure location;
      build a path loss database over a time period from the path loss information; and
      manage power or operation mode of a first RAT and a second RAT of the access point based on the path loss database; and
    at least one transceiver configured to:
      receive, from a user equipment, a second RAT signal measurement, in response to a first RAT signal measurement being below a first threshold and the second RAT signal measurement being above a second threshold;
    wherein the at least one processor determines the path loss information based on the second RAT signal measurement.

11. The apparatus of claim 10, wherein the at least one processor is further configured for:
    determining a path loss value based on the path loss database; and
    comparing the path loss value with a threshold value, wherein the managing is based on the comparing.

12. The apparatus of claim 10, further comprising at least one transceiver configured for:
    receiving, from a user equipment, a measurement report for the second RAT, in response to the user equipment experiencing a circuit switched fallback failure, wherein determining the path loss information is based on the measurement report for the second RAT.

13. The apparatus of claim 10, further comprising at least one transceiver configured for:
    periodically receiving, from a user equipment, a first RAT signal measurement and a second RAT signal measurement, wherein the first RAT signal measurement and the second RAT signal measurement are received as a pair substantially simultaneously or within a time period from each other,
    wherein the at least one processor is further configured for determining a specific pair where the first RAT signal measurement is below a first threshold and the second RAT signal measurement is above a second threshold, wherein determining the path loss information is based on the second RAT signal measurement from the specific pair.

14. A non-transitory computer-readable medium storing executable instructions which cause a data processing device to:
    determine, at an access point, path loss information for a circuit switched fallback failure location;

build a path loss database over a time period from the path loss information; and manage power or operation mode of a first RAT and a second RAT of the access point based on the path loss database; and determine a path loss value based on a second RAT path loss value when a first RAT path loss value is below a threshold value and the second RAT path loss value is above the threshold value.

15. The non-transitory computer-readable medium of claim 14, further storing executable instructions for causing the data processing device to:

determine the path loss value based on the path loss database; and compare the path loss value with a threshold value, wherein the managing is based on the comparing.

16. The non-transitory computer-readable medium of claim 15, further storing executable instructions for causing the data processing device to enable the first RAT of the access point, in response to determining that the path loss value is less than the threshold value.

17. The non-transitory computer-readable medium of claim 15, further storing executable instructions for causing the data processing device to reduce a transmit power level by a reduction amount for the second RAT of the access point, in response to determining that the path loss value is greater than the threshold value.

18. The non-transitory computer-readable medium of claim 14, further storing executable instructions for causing the data processing device to collect at least one circuit switched fallback failure report for a duration, wherein determining the path loss information is based on the at least one circuit switched fallback failure report.

* * * * *